United States Patent
Xia

(10) Patent No.: US 12,024,347 B2
(45) Date of Patent: Jul. 2, 2024

(54) OVERMOLDED SEAL MEMBER

(71) Applicant: The Coleman Company, Inc., Wichita, KS (US)

(72) Inventor: Sichong Xia, Chicago, IL (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 17/812,626

(22) Filed: Jul. 14, 2022

(65) Prior Publication Data

US 2023/0021092 A1 Jan. 19, 2023

Related U.S. Application Data

(60) Provisional application No. 63/222,272, filed on Jul. 15, 2021.

(51) Int. Cl.
| | |
|---|---|
| *B65D 53/02* | (2006.01) |
| *B29C 45/14* | (2006.01) |
| *B29K 667/00* | (2006.01) |
| *B29L 31/56* | (2006.01) |
| *B65D 47/08* | (2006.01) |
| *B65D 51/24* | (2006.01) |

(52) U.S. Cl.
CPC .............. *B65D 53/02* (2013.01); *B29C 45/14* (2013.01); *B65D 47/0871* (2013.01); *B65D 51/242* (2013.01); *B29K 2667/00* (2013.01); *B29L 2031/565* (2013.01)

(58) Field of Classification Search
CPC .. B65D 53/02; B65D 47/0871; B65D 51/242; B29C 45/14; A47G 19/2272
See application file for complete search history.

(56) References Cited

U.S. PATENT DOCUMENTS

| | | | | |
|---|---|---|---|---|
| 5,868,273 | A  * | 2/1999 | Daenen .............. | B65D 43/0212 |
| | | | | 220/780 |
| 7,007,817 | B2 * | 3/2006 | Jochem .............. | B65D 41/0435 |
| | | | | 215/305 |
| 9,630,351 | B2 * | 4/2017 | Ramos ................ | B29C 45/1418 |
| 11,377,270 | B2 * | 7/2022 | Meyers .............. | A47G 19/2272 |
| 11,396,407 | B2 * | 7/2022 | Tsai ................... | B65D 47/0871 |
| 11,472,611 | B1 * | 10/2022 | Hove .................... | B65D 41/04 |
| 2002/0113032 | A1 * | 8/2002 | Blomdahl ............ | B65D 51/245 |
| | | | | 215/303 |
| 2004/0245207 | A1 * | 12/2004 | Chomik .............. | B29C 45/1676 |
| | | | | 215/370 |
| 2011/0089509 | A1 * | 4/2011 | Lu .......................... | H10N 50/80 |
| | | | | 257/E29.323 |
| 2015/0282654 | A1 * | 10/2015 | Kurabe .............. | A47G 19/2272 |
| | | | | 220/254.5 |
| 2017/0144809 | A1 * | 5/2017 | Sorensen ............... | B65D 43/22 |
| 2017/0297785 | A1 * | 10/2017 | Maruyama ............. | B65D 41/04 |
| 2021/0039846 | A1 * | 2/2021 | Jinkins ............... | B65D 47/0871 |

FOREIGN PATENT DOCUMENTS

WO    WO-2011091834 A1 *  8/2011  ......... B29C 45/1676

* cited by examiner

*Primary Examiner* — James N Smalley
(74) *Attorney, Agent, or Firm* — Husch Blackwell LLP

(57) ABSTRACT

A seal member is provided that may prevent fluids from leaking from a drinking bottle, such as a reusable water bottle. The seal member may be overmolded into a lid of the bottle such that the seal chemically and mechanically bonds to the lid. Overmolding the seal member eliminates gaps that could form between the seal and the lid, thus enhancing the cleanability of the seal member and the lid.

20 Claims, 4 Drawing Sheets

OVERMOLDED SEAL MEMBER

CROSS-REFERENCE TO RELATED APPLICATIONS

This application claims priority to U.S. Provisional Patent Application Ser. No. 63/222,272, filed on Jul. 15, 2021, entitled "OVERMOLDED SEAL MEMBER," the entire disclosure of which is incorporated herein by reference.

FIELD OF INVENTION

The present invention relates generally to seal members within drinking bottles, and more particularly to an overmolded seal member within a lid of a reusable drinking bottle.

BACKGROUND OF INVENTION

Consumers utilize reusable bottles as an environmentally friendly way to maintain access to potable water. Consumers may simply fill the bottle from a water source in their homes and take the bottle with them "on the go." By drinking from a reusable bottle, consumers do not have to worry about the environmental waste generated by single-use bottles, such as those available from vending machines or convenience stores.

However, traditional reusable bottles may have multiple components that make the bottle difficult to clean. During washing, the bottle's components (which may include a lid, a straw, and a body) each individually require the consumers' attention to ensure that the components are properly sanitized. Further, the consumers must ensure that a cleaning agent contacts the components' surfaces for a set amount of time for proper sanitation. Improper cleaning of the components can lead to a buildup of residues, molds, and/or bacteria that may contaminate the fluid stored within the bottle.

Adding to the challenge faced by consumers, many reusable bottles include a flexible seal that is assembled into the lid. The flexible seal may help prevent water from leaking out of the bottle when the bottle is shut. Depending on the lid's structure, the seal may be pushed into and/or over an opening in the lid to prevent the bottle's contents from spilling out. Unfortunately, because the seal is assembled into the cap rather than being affixed to the cap, gaps often form between the seal and the lid. Such gaps may be created over time upon use by the consumers, or they may develop during the manufacturing process. Liquids may flow into the gaps and leave behind residues or nutrients that promote the growth of bacteria and/or mold. Also, cleaning the seal is nearly impossible because consumers cannot ensure cleaning agent reaches the gap between the seal member and the lid. Further, liquid that penetrates this gap may fail to evaporate, even after an extended period of time, leading to additional risk for contamination.

SUMMARY OF INVENTION

The present invention overcomes many of the shortcomings and limitations of the prior art devices discussed above. The invention described includes several embodiments of a seal overmolded into a lid of a bottle. The overmolded seal may help improve the lid's cleanability. Overmolding bonds the seal to the lid both mechanically and chemically. The combination of mechanical and chemical bonding helps prevent the formation of gaps between the seal and the lid. Thus, the overmolded seal may help prevent the accumulation of unwanted materials within the bottle.

The overmolded seal described herein is also preferably much easier to clean than seals in the prior art. To clean the improved, overmolded seal, the consumer preferably only needs to clean the seal's visible surfaces. The consumer does not need to worry about ensuring that a cleaning agent penetrates "hard to reach" spaces between the seal and lid, because there are preferably no gaps between the seal and the lid. Further, because the invention improves the cleanability of the lid, it helps prevent the growth of bacteria or mold within the bottle.

In some embodiments, the seal and/or the lid of the present invention may be composed of a translucent material. A translucent seal and/or lid may help consumers more easily determine if any liquids remain in the lid after drinking from the bottle. That way, consumers can clean and/or dry the lid appropriately.

These and other aspects and advantages of the present invention will become apparent to those skilled in the art after considering the following detailed description in connection with the accompanying drawings.

Figure 1:
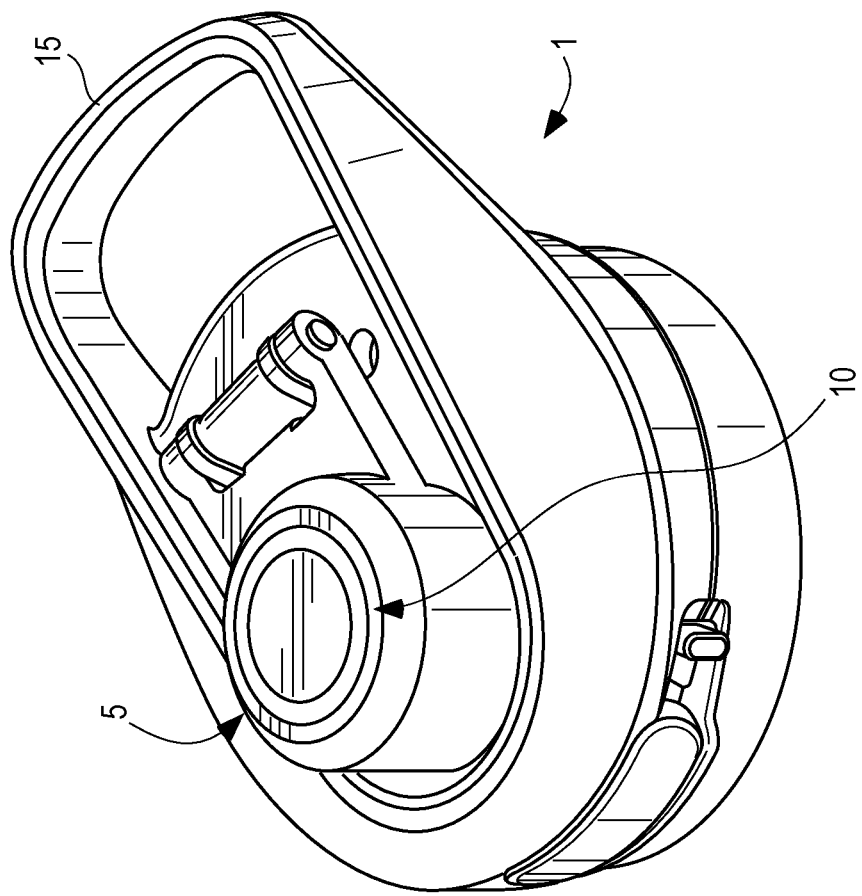
FIG. 1 is a top isometric view of a lid with a cap member in a closed position, the cap member having a seal constructed according to the teachings of the present invention.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

FIG. 1 illustrates a lid 1 that may be used with a bottle adapted to hold liquids, such as a reusable water bottle (not illustrated). The lid 1 may be attached to the bottle in several ways. For example, the lid 1 may be rotatably attached to the bottle or it may be affixed to the bottle via a friction fit. The lid 1 may be closed to prevent fluids from spilling from the bottle if the bottle is, for example, tipped onto its side or held upside down.

The lid 1 may include a cap member 5 that can be moved between a closed position and an open position. In the closed position (as illustrated in FIG. 1) the cap member 5 may help prevent fluid from spilling through the lid 1 and out of the bottle. The cap member 5 may further include a seal 10. The seal 10 may assist the cap member 5 in preventing fluid from leaking from the lid 1. Preferably, the seal 10 is overmolded into the cap member 5 and there are preferably no gaps formed between the cap member 5 and the seal 10 within which debris, bacteria, or mold can accumulate.

The lid 1 may also include a handle 15 that assists the user in carrying the bottle. The handle 15 may be shaped such that a user can easily grab the handle 15 with her hand or fingers. As illustrated, the handle 15 extends away from the lid 1 and is U-shaped, although other shapes and positions for the handle 15 are foreseeable.

Figure 2:
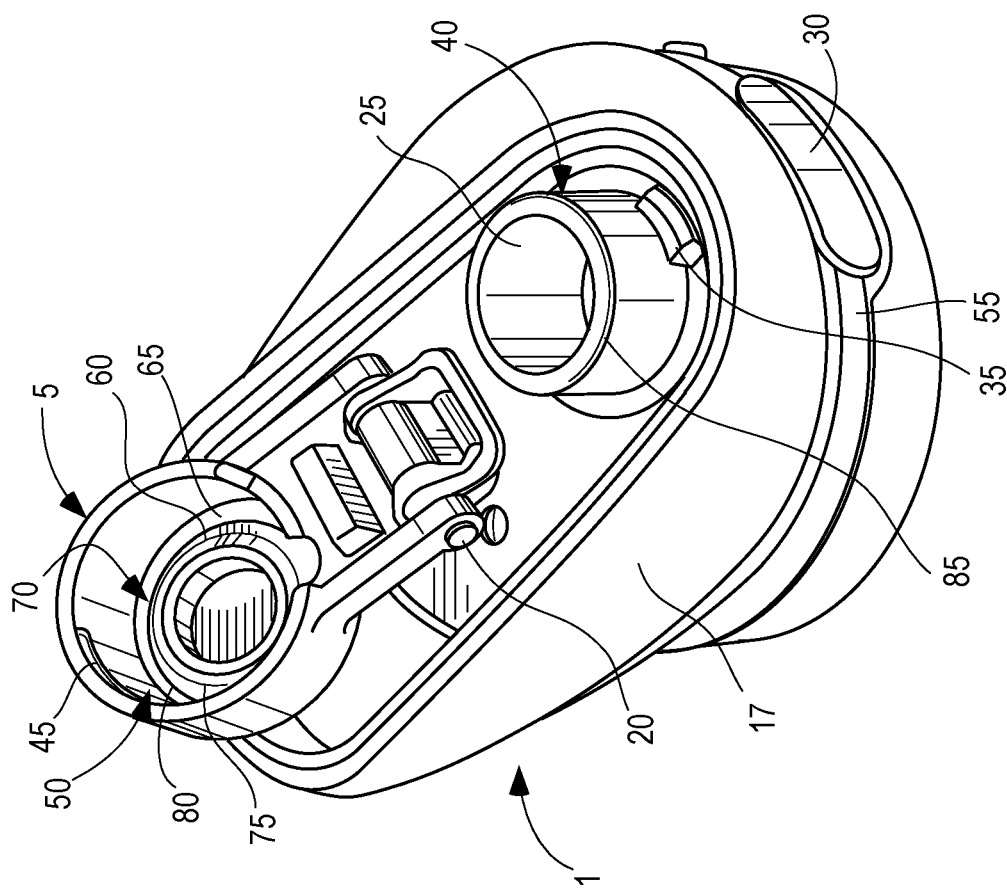
FIG. 2 is a top isometric view of the lid of FIG. 1, with the cap member in an open position.

When a user wishes to take a drink from the bottle, the user may move the cap member 5 to its open position, as illustrated in FIG. 2. The cap member 5 may be rotatably connected to a frame 17 of the lid 1 by pin members 20, although the use of other connection mechanisms (e.g., screw members) are foreseeable. The pin members 20 may allow the cap member 5 to rotate, or hinge, upwardly and away from the lid 1. Once the cap member 5 is in the open position, an opening 25 in the lid 1 may be accessed by the user, and the user may drink from the bottle that the lid 1 is affixed to.

In the illustrated embodiment, the user may push a button 30 to release a latch 35 of the cap member 5 before the cap member 5 can be placed into the open position. The latch 35 may be a small protrusion that extends outwardly from a throat member 40. Further, the latch 35 may be sized and shaped such that it may be received into a complementary notch 45 (disposed of in an interior 50 of the cap member 5) when the cap member 5 is closed. Thus, when the cap member 5 is closed, the latch prevents the cap member 5 from travelling upwardly, thereby securing the cap member 5 in the closed position. In at least one embodiment, the latch 35 is not included, and a user may simply apply an upwards force to the cap member 5 to open the lid 1. In such embodiments, the cap member 5 may be friction fit with the lid 1 to retain the cap member 5 in place in the closed position.

The button 30 may be positioned and located on an outside surface 55 of the lid 1. The button 30 is preferably sized such that a user may press the button 30 with a finger when the user wishes to drink from the bottle. Further, the button 30 may be positioned such that the user can press the button 30 when the user is gripping the bottle in preparation to drink therefrom. When the button 30 is pushed into the lid 1 by the user, the latch 35 may move out of the complementary notch 45, releasing the cap member 5. The user may then rotate the cap member 5 upwardly and away from the opening 25. In some embodiments, the cap member 5 may be biased to rotate upwardly and away from the opening 25 without user intervention when the cap member 5 is released from the latch 35, for example by a spring (not illustrated).

When the cap member 5 is in the open position, the throat member 40 may guide fluid out of the bottle and through the opening 25. The throat member 40 may be formed in the shape of an open cylinder with sidewalls that extend upwardly from the frame 17 of the lid 1, although other shapes for the throat member 40 are foreseeable. When the user wishes to drink from the bottle, the user may tip the bottom of the bottle upwards so that fluid flows through the opening 25 of the throat member 40 and out of the bottle.

A bottom surface 60 of the seal 10 is affixed to a bottom portion 65 of the cap member 5. The bottom surface 60 of the seal 10 may be integrally formed as a structure including a ring 70 having an inner circumference 75 and an outer circumference 80. The ring 70 may be substantially flat, or it may be tapered from the inner circumference 75 to the outer circumference 80. For example, if the ring 70 is tapered, its thickness may decrease from the inner circumference 75 to the outer circumference 80. The diameter of the inner circumference 75 may be somewhat smaller than the diameter of the opening 25, while the diameter of the outer circumference 80 may be somewhat larger than the diameter of a rim 85 of the throat member 40. Thus, when a user closes the cap member 5, the bottom surface 60 of the seal 10 may abut the rim 85 of the throat member 40 such that the opening 25 is sealed to help prevent fluid from exiting the lid 1.

Figure 3:
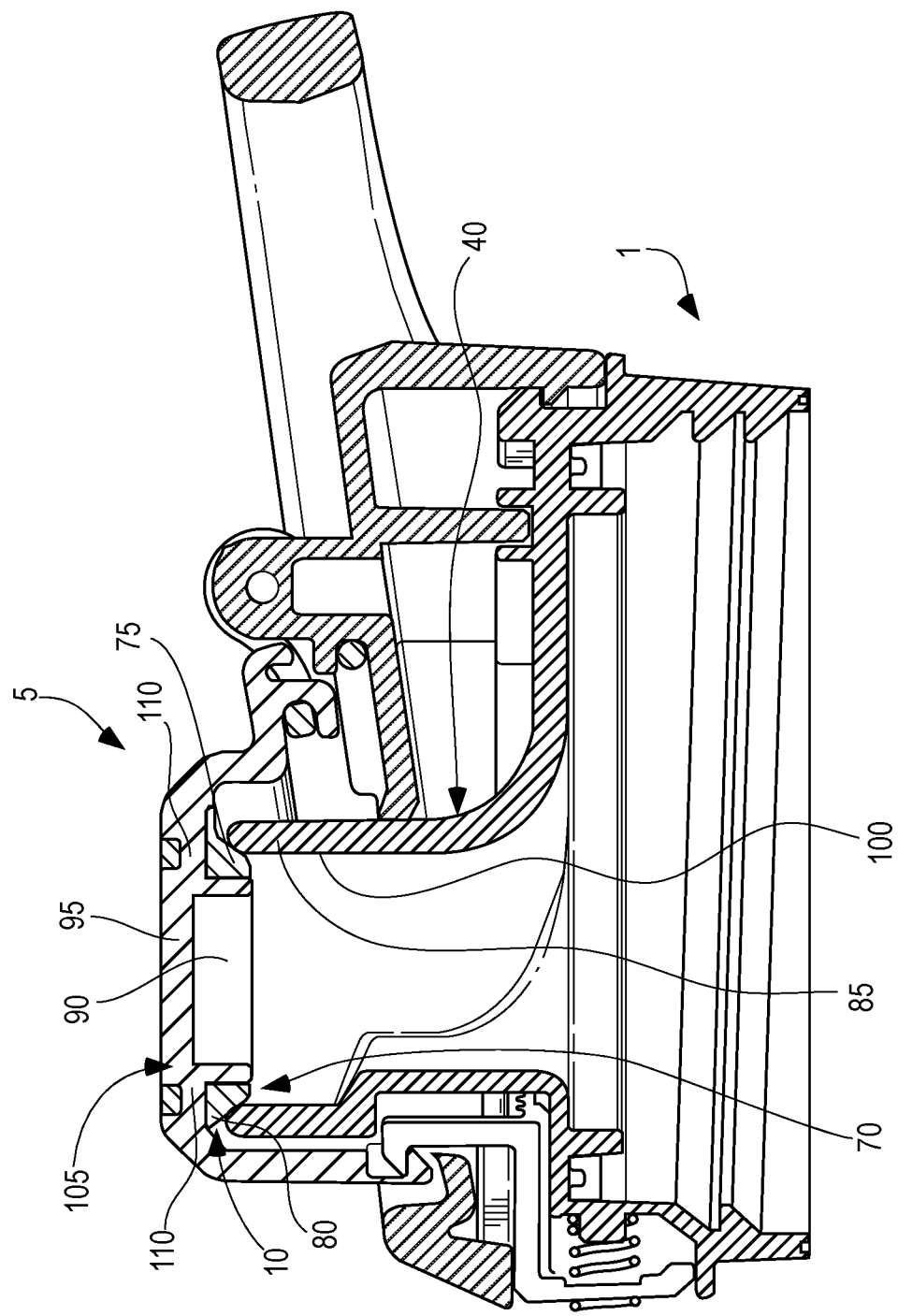
FIG. 3 is a cross-sectional view of the lid of FIG. 1 with the cap member in a closed position.

Turning to FIG. 3, when the cap member 5 is closed, the ring 70 of the seal 10 may surround a cylindrical recess 90 formed in the cap member 5. The cylindrical recess 90 may extend downwardly from a top portion 95 of the cap member 5 such that the inner circumference 75 of the ring 70 can be affixed to the cylindrical recess 90. When the cap member 5 is closed, the inner circumference 75 of the seal 10 abuts an interior surface 100 of the rim 85. Thus, when the lid 1 is closed, the flow of fluid out of the lid 1 may be prevented by the seal 10 and the cap member 5.

Preferably, the thickness of the ring 70 decreases from the inner circumference 75 to the outer circumference 80. This tapering of the ring 70 may help facilitate a friction fit between the seal 10 and the throat member 40 when the cap member 5 is in the closed position. In effect, when a user closes the lid 1 by pressing the cap member 5 downwardly over the throat member 40, the inner circumference 75 may penetrate further downwardly into the throat member 40 and provide a more secure friction fit than if the ring 70 is provided without tapering.

In a preferred embodiment, the seal 10 is formed in the cap member 5 via overmolding. As known in the art, overmolding is a process by which a substrate is partially or fully covered by a second material during a manufacturing process. During overmolding, the substrate and the second material may chemically bond to one another and mechanically interlock. In effect, the overmolding process may provide additional support and integration between the substrate and the second material. Thus, overmolding may eliminate the need for adhesives or fasteners to affix the second substance to the substrate.

In a preferred embodiment of the invention, the cap member 5 is composed of a copolyester or plastic, such as Tritan™, and the seal 10 is composed of a polymer, such as liquid silicone rubber ("LSR"). Advantageously, the combination of Tritan™ and LSR allows the manufacturer to produce a lid and a seal that are transparent or that can be dyed a particular color. Additional compositions for the cap member 5 and the seal 10 would be appreciated by those skilled in the art.

During manufacturing, the cap member 5 may be molded before the seal 10. Once the cap member 5 is created, it may be placed into a LSR mold. Then, LSR may be injected into the LSR mold and into a body 105 of the cap member 5. The body 105 may have open chambers (not illustrated) with a predetermined volume which are substantially or completely filled with LSR during overmolding. The open chambers may be separated by supports 110 which define the outer boundaries of the open chambers within the body 105. The supports 110 may extend substantially perpendicularly from the cylindrical recess 90 of the cap member 5, although other positions for the supports 110 are foreseeable. The cap member 5 may have at least two supports 110, although more or fewer supports 110 may be included as would be appreciated by those skilled in the art. During overmolding, the LSR that comprises the seal 10 may bond chemically and mechanically to the cap member 5. The chemical bonding can occur at any position or location where the seal 10 and the cap member 5 contact one another. In comparison, mechanical bonding can occur in locations where the cap member 5 physically surrounds or supports the seal 10. For example, mechanical bonding may occur within the open chambers that are surrounded by the supports 110, and friction may secure the LSR within the open chambers. Advantageously, the mechanical bonds may hold the seal 10 in place if the chemical bonds between the seal 10 and the cap member 5 fail.

Figure 4:
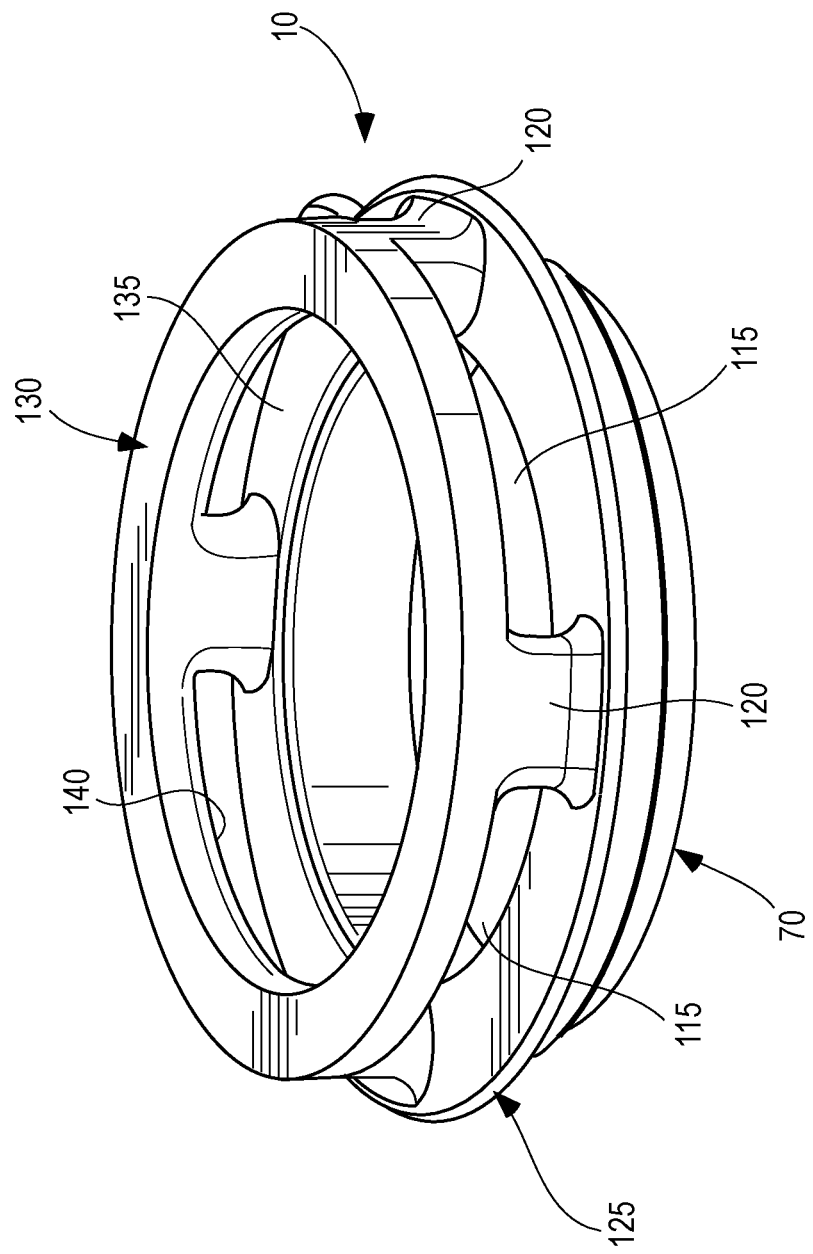
FIG. 4 is an isometric view of the seal of FIG. 1.

Turning to FIG. 4, one embodiment of the seal 10 is illustrated. Because the seal 10 is injected into the cap member 5, the physical structure and form of the seal 10 may partially depend on the structure of the cap member 5 itself. For example, the seal 10 may have gaps 115 which are occupied by the supports 110 of the cap member 5 (illustrated in FIG. 3) when the seal 10 is within the cap member 5. In addition, columns 120 of the seal 10 may occupy the volume of the open chambers of the cap member 5. Thus, if the quantity, size or positions of the supports 110 or the open chambers of the cap member 5 change, the quantity, size, and positions of the gaps 115 and the columns 120 of the seal 10 may also change. In effect, because different physical embodiments of the cap member 5 are foreseeable, different embodiments of the seal 10 would be appreciated by those skilled in the art. Further, manufacturers may select from a variety of LSR molds to use during overmolding; the different molds may lead to different physical structures for the seal 10.

As stated previously, the seal 10 is chemically and mechanically bonded to the cap member 5. The formation of these bonds may be facilitated by the structure of the seal 10. In addition to the ring 70, the seal 10 may have a middle ring 125 and a top ring 130. In at least one embodiment, a top surface 135 of the ring 125 and a bottom surface 140 of the ring 130 may chemically bond with the cap member 5. The size of the rings 70, 125, 130 may be altered to enhance the mechanical or chemical bonding between the seal 10 and the cap member 5 as desired. For example, the middle ring 125 may be larger than the rings 70, 130 such that the top surface 135 has a large surface area upon which additional chemical bonding between the seal 10 and cap member 5 can occur. Further, the columns 120 may enhance the mechanical bonding between the seal 10 and the cap member 5 since they are retained within the chambers of the cap member 5 and connect the rings 70, 125, 130. Finally, the top ring 130, like the ring 125, may enhance the chemical bonding between the seal 10 and the cap member 5 at locations where the top ring 130 contacts the cap member 5.

As is evident from the foregoing description, certain aspects of the present invention is not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations and other uses in applications which do not depart from the spirit and scope of the present inventions are deemed to be covered by the inventions which are limited only by the claims which follow.

The invention claimed is:

1. A closure system for a bottle comprising:
   a lid including:
   a frame;
   an opening provided within and extending through the frame; and
   a cap member comprising a cylindrical sidewall having an inner edge, wherein the inner edge defines an inner diameter of the cylindrical sidewall, and the cap member is rotatably affixed to the frame;
   an overmolded seal including:
   a top portion;
   a bottom portion; and
   at least one column that connects the top portion and the bottom portion;
   wherein at least a portion of the bottom portion of the overmolded seal is integrally formed and retained within the cap member;
   wherein the overmolded seal is imparted with an outer diameter that is less than the inner diameter of the cylindrical sidewall of the cap member; and
   wherein, when the cap member is in a closed position, the bottom portion of the overmolded seal abuts the opening of the lid and substantially prevents fluids from exiting through the opening.

2. The closure system of claim 1, wherein a body of the cap member further includes at least one open chamber extending through the body, the at least one open chamber having a predetermined volume.

3. The closure system of claim 2, wherein the at least one column of the overmolded seal is retained within the at least one open chamber of the cap member.

4. The closure system of claim 1, wherein the overmolded seal is composed of a polymer and the lid is composed of a copolyester.

5. The closure system of claim 1, wherein a portion of the overmolded seal substantially fills a predetermined volume of an at least one open chamber of the cap member.

6. The closure system of claim 1, wherein the overmolded seal chemically bonds to surfaces of an at least one open chamber and surfaces of the cap member upon curing.

7. The closure system of claim 1, wherein the at least one column is adapted to mechanically bond the overmolded seal to the cap member.

8. A closure system comprising:
   a lid with a cap member rotatably coupled thereto, the cap member further including:
   a body comprising a cylindrical wall, wherein the cylindrical wall includes an outer surface defining an outermost diameter of the cylindrical wall; and
   a cylindrical recess positioned and located within the body and substantially surrounded by an inner surface of the cylindrical wall; and
   an overmolded seal including:
   a top ring;
   a bottom ring including an inner circumference and an outer circumference, wherein the bottom ring tapers from the inner circumference to the outer circumference; and
   an at least one column that extends vertically from the bottom ring to the top ring;
   wherein the at least one column secures the overmolded seal to the lid;
   wherein the top ring and the bottom ring substantially surround and abut the outer surface of the cylindrical wall; and
   wherein at least one of the top ring, the bottom ring, and the at least one column are chemically bonded to surfaces of the lid.

9. The closure system of claim 8, wherein the at least one column is retained within the lid.

10. The closure system of claim 8, wherein the at least one column mechanically bonds the overmolded seal to the lid.

11. The closure system of claim 10, wherein a mechanical bond is at least partially provided by a friction force.

12. The closure system of claim 8, wherein the top ring is imparted with a first diameter, the bottom ring is imparted with a second diameter, and the second diameter is greater than the first diameter.

13. The closure system of claim 8, wherein the lid is composed of a copolyester and the overmolded seal is composed of liquid silicone rubber.

14. The closure system of claim 8, wherein at least one of the lid and the overmolded seal are translucent.

15. A method for molding a seal in a cap member of a lid, the method comprising:
   providing the cap member, the cap member including a cylindrical sidewall having an inner surface defining an inner diameter of the cylindrical sidewall;
   placing the lid into a liquid polymer mold;
   injecting a liquid polymer into the liquid polymer mold;
   curing the liquid polymer to chemically bond the liquid polymer to the cap member; and
   forming an overmolded seal from the liquid polymer, the overmolded seal provided in the form of:
      a top ring;
      a bottom ring, the bottom ring tapering from an inner circumference of the bottom ring to an outer circumference of the bottom ring;
      and at least one column that extends vertically from the bottom ring to the top ring;
   wherein the at least one column secures the overmolded seal to the lid;
   wherein at least one of the top ring, the bottom ring, and the at least one column are chemically bonded to surfaces of the lid; and
   wherein a first diameter of the top ring and a second diameter of the bottom ring are each less than the inner diameter of the cylindrical sidewall.

16. The method of claim 15, wherein the cap member further includes at least one open chamber having a predetermined volume.

17. The method of claim 15, wherein the liquid polymer is injected into an at least one open chamber of the cap member such that the liquid polymer substantially fills a predetermined volume of the at least one open chamber and a volume of the liquid polymer mold.

18. The method of claim 17, wherein the curing includes chemically bonding the liquid polymer to the at least one open chamber of the cap member.

19. The method of claim 15, wherein the cap member further includes an at least one open chamber with outer boundaries defined by an at least one support provided in a body of the cap member.

20. The method of claim 15, wherein the cap member is composed of a plastic.

* * * * *